United States Patent [19]
Konomi

[11] Patent Number: 5,802,358
[45] Date of Patent: Sep. 1, 1998

[54] DIGITAL AUDIO DATA PHASE SHIFTING APPARATUS

[75] Inventor: Toshiharu Konomi, Kasuya-gun, Japan

[73] Assignee: Matsushita Electric Industrial Co., Ltd., Osaka, Japan

[21] Appl. No.: 572,494

[22] Filed: Dec. 14, 1995

[30] Foreign Application Priority Data

Dec. 16, 1994 [JP] Japan .................. 6-313408

[51] Int. Cl.⁶ .................. G06F 1/04; G06F 1/12
[52] U.S. Cl. .................. 395/558; 395/559
[58] Field of Search .................. 395/558, 559, 395/560, 849, 872, 873, 877, 878, 880, 551

[56] References Cited

U.S. PATENT DOCUMENTS

| | | |
|---|---|---|
| 4,873,703 | 10/1989 | Crandall et al. .................. 375/118 |
| 5,333,299 | 7/1994 | Koval et al. .................. 395/550 |
| 5,384,890 | 1/1995 | Anderson et al. .................. 395/2 |
| 5,487,167 | 1/1996 | Dinallo et al. .................. 395/650 |

*Primary Examiner*—Dennis M. Butler
*Attorney, Agent, or Firm*—Ratner & Prestia

[57] ABSTRACT

The timing controller receives a clock signal and a synchro signal outputted from a transmission side device, and a clock signal and a synchro signal outputted from a reception side device, and detects a writing timing of the transmission side device from these signals, thereby once storing the audio data, which is serial data, into a data storage through a serial-parallel converter, or detects a reading timing of the reception side device of the timing controller, thereby outputting the audio data stored in the data storage as serial data through the parallel-serial converter. In this constitution, adjusting deviation of phase between the devices, audit data can be transmitted.

13 Claims, 4 Drawing Sheets

DIGITAL AUDIO DATA PHASE SHIFTING APPARATUS

BACKGROUND OF THE INVENTION

The present invention relates to a digital audio data phase shifting apparatus used in transmission of audio signals between terminal devices connected to a digital circuit network such as ISDN (integrated services digital network) and LAN (local area network).

Transmission of digital data has recently come to handle audio and video information, and as the digital circuit networks such as private LAN are spreading widely, the interface of terminal devices connected to circuit networks are digitized, and connections with circuit networks can be realized more easily than before.

In a conventional transmission method, it was general to transmit by bundling a specific quantity of data as one unit, and as a real-time communication method of audio data between terminal devices, using one device as the master side and the other device as the slave side, audio data was transmitted by synchronizing the input timing of the slave side with the output timing of the master side.

As the slave side, however, a terminal device of high performance, such as cordless telephone, having a higher precision than the precision of reference clock of the device functioning as the master side has been introduced, and therefore to maintain the conventional synchronous transmission, it has been required to enhance the clock precision of the master side and hence install expensive parts. Or, when connecting a performance terminal device such as cordless telephone newly to an exiting circuit network, it is difficult to synchronize between the master side and slave side because the clock precision is different. All these problems are caused because of the synchronous system which is intended to transmit all data completely.

By contrast, such problems are solved in the asynchronous system. However, since the master side and slave side are working at a mutually independent timing, different problems occur unless the clock of each reference timing is accurate. For example, when a reference oscillator with frequency precision of 100 ppm is used at the master side, transmission of 1 million pieces of data results in data shortage or surplus of maximum 100 pieces, and in the PCM (pulse coded modulation) or ADPCM (adaptive differential PCM generally used as code modulation system, sound skipping or noise of about 125 μsec occurs periodically at a rate of about once in every second, which was very irritating to the user.

SUMMARY OF THE INVENTION

To solve the above problems, it is hence a primary object of the invention to provide a digital audio data phase shifting apparatus capable of transmitting digital modulated audio signals between asynchronous devices without deteriorating sound quality. To achieve the object, the invention provides a digital audio data phase shifting apparatus comprising serial-parallel converting means for receiving audio data entered from the transmission side as serial data and converting into parallel data, data storing means for writing in and storing temporarily the audio data as parallel data from the serial-parallel converting means, parallel-serial converting means for reading out audio data as parallel data from the data storing means and converting again into serial data and sending out to the reception side, and timing control means for receiving a first clock signal and a first synchro signal from the transmission side and a second clock signal and second synchro signal from the reception side, and controlling the writing and reading timing of audio data in the data storing means.

In this constitution, when transmitting digital data between devices working independently from each other, by writing into the data storing means on the basis of the first clock signal and first synchro signal at the transmission side, and reading out of the data storing means on the basis of the second clock signal and second synchro signal at the reception side, an excellent digital audio data phase shifting apparatus capable of adjusting timing deviation due to difference in clock signal and phase deviation due to difference in synchro signal can be realized.

DESCRIPTION OF THE PREFERRED EMBODIMENTS (Embodiment 1)

A first embodiment of the invention is described below by reference to a diagram.

Figure 1:
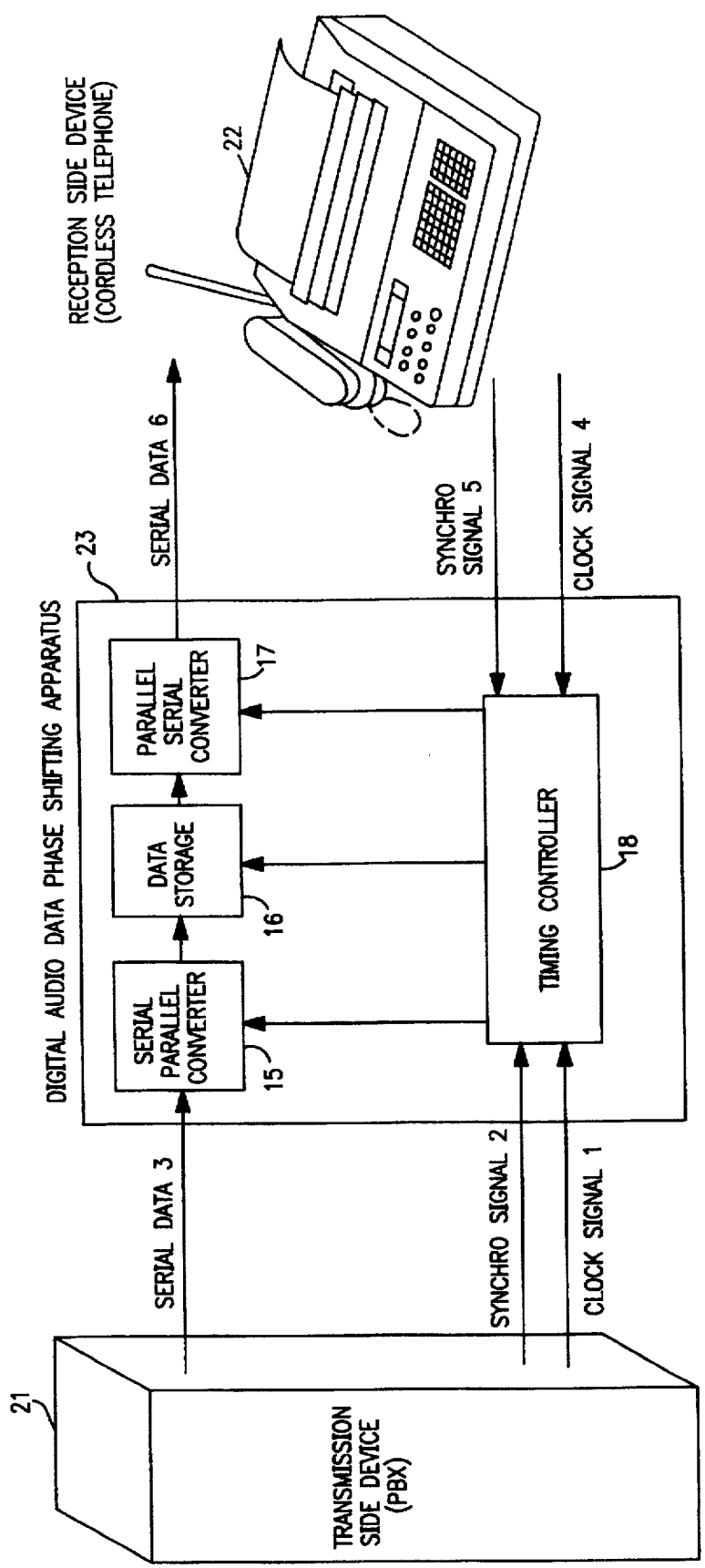
FIG. 1 is a block diagram shoving a constitution of a digital audio data phase shifting apparatus in a first embodiment of the invention.

FIG. 1 is a block diagram showing a constitution of a digital audio data phase shifting apparatus in a first embodiment of the invention, in which a transmission side device 21 and a reception side device 22 work independently from each other, and are connected with each other through a digital network by way of a digital audio data phase shifting apparatus 23.

In this embodiment, the transmission side device 21 is a PBX (private branch exchange), and the reception side device 22 is a cordless telephone set.

In FIG. 1, the digital audio data phase shifting apparatus 23 comprises a serial-parallel converter 15 for converting input serial data into parallel data, a parallel-serial converter 17 for converting parallel data into serial data, a data storage 16 for exchanging data between the serial-parallel converter 15 and parallel-serial converter 17, and a timing controller 18 for receiving clock signals 1, 4 and synchro signals 2, 5 from the transmission side device 21 and the reception side device 22, respectively, and controlling the data input and output timing in the data storage 16.

In thus constitution digital audio data phase shifting apparatus, its operation is described below.

When transmitting audio data from the transmission side device 21 to the reception side device 22, the clock signal 1 and synchro signal 2 showing the writing timing of data outputted from the transmission side device 21, and serial data 3 which is digital audio data are put into the digital audio data phase shifting apparatus 23.

Specifically, the clock signal 1 and synchro signal 2 are put into the timing controller 18, and the serial data 3 is put into the serial-parallel converter 15. From the reception side device 22, moreover, the clock signal 4 and synchro signal 5 showing the data reading timing are transmitted to the digital audio data phase shifting apparatus 23, and put into the timing controller 18.

The digital audio data phase shifting apparatus 23 judges the writing timing of serial data 3 at the transmission side device 21 in the timing controller 18, from the clock signal 1 and synchro signal 2 entered from the transmission side device 21, converts the serial data 3 into parallel data in the serial-parallel converter 15, and once stores in the register of the data storage 16.

At the same time, the timing controller 18 judges the data reading timing of the serial data 6 at the reception side device 22, from the clock signal 4 and synchro signal 5 entered from the reception side device 22, converts the data stored in the data storage 16 from parallel to serial in the parallel-serial converter 17, and sends out as serial data 6 to the reception side device 22.

In this constitution, the serial data 3 transmitted from the transmission side device 21 is written into the data storage 16 in order to obtain the bit writing timing into the data storage 16 by the clock signal 1, and to synchronize the phase by defining a break in a specific bit row by the synchro signal 2, and therefore by sending out the data read out from the data storage 16 by the clock signal 4 and synchro signal 5 into the reception side device 22, the data is transmitted, when receiving, with delay of one specific bit row (generally called frame, but called one piece of data hereinafter). In the PCM system or ADPCM system generally employed as the audio code modulation system, the sampling frequency into digital data is 8 kHz, and delay of one piece of data is about 125 μsec, which can be practically ignored.

Thus, in this embodiment, by placing the digital audio data phase shifting apparatus 23 having the data storage 16 between the transmission side device 21 and reception side device 22 working independently from each other, input and output of audio data between blocks are controlled by the timing controller 18, on the basis of the clock signals 1, 4, and synchro signals 2, 5 of the transmission side device 21 and reception side device 22. Accordingly, the writing timing of audio data from the transmission side device 21, and the reading timing of audio data by the reception side device 22 can be separated independently, and the phase deviation of audio data in the serial data transmission can be adjusted.

(Embodiment 2)

A second embodiment of the invention is described below by reference to a diagram.

Figure 2:
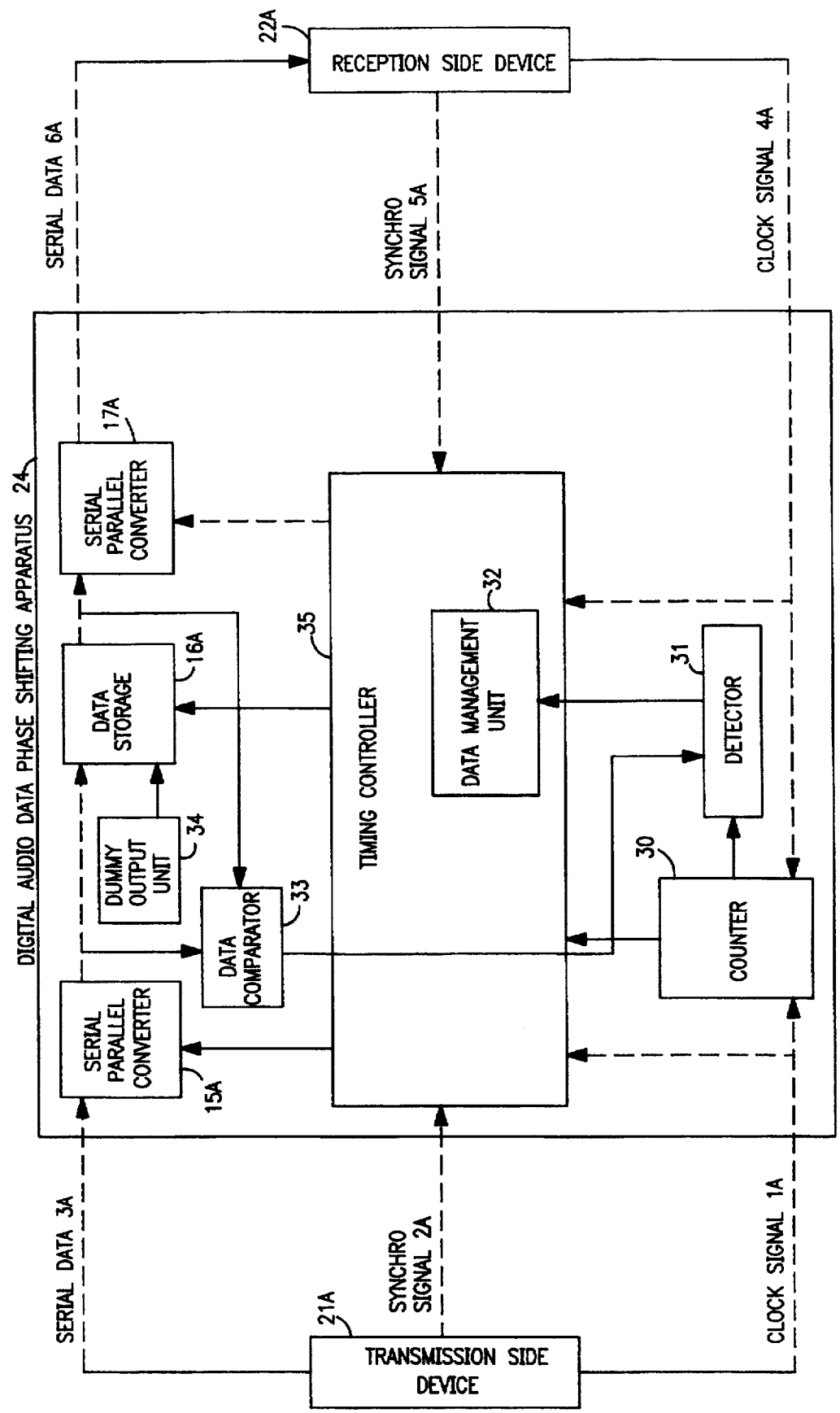
FIG. 2 is a block diagram shoving a constitution of a digital audio data phase shifting apparatus in a second embodiment of the invention.

FIG. 2 is a block diagram showing a constitution of a digital audio data phase shifting apparatus 24 in the second embodiment of the invention.

In this embodiment, same as in embodiment 1, the transmission side device 21A is a PBX and the reception side device 22A is a cordless telephone set, and they are connected through a digital circuit by way of the digital audio data phase shifting apparatus 24.

In FIG. 2, the digital audio data phase shifting apparatus 24 comprises a serial-parallel converter 15A for converting input serial data into parallel data, a parallel-serial converter 17A for converting parallel data into serial data, a data storage 16A for exchanging data between the serial-parallel converter 15A and parallel-serial converter 17A, a counter 30 for counting the number of pulses of clock signal 1A of the transmission side device 21A and clock signal 4A of the reception side device 22A, a detector 31 for deleting data, a data management unit 32 for detecting presence or absence of data in the data storage 16A, a data comparator 33 for comparing data, a dummy output unit 34 for outputting dummy data into the data storage 16A, and a timing controller 35.

What this embodiment differs from embodiment 1 lies in the provision of means for preventing lowering of sound quality due to surplus of audio data or lack of audio data in the data storage 16A, when the writing timing of the audio data outputted from the transmission side device 21A is earlier than the reading timing of audio data entered into the reception side device 22A, or in a contrary case.

In thus constituted digital audio data phase shifting apparatus, its operation is described below.

A synchro signal is transmitted in synchronism with a clock signal, and supposing that the synchro signal 5A is sent out from the reception side device 22A to the digital audio data phase shifting apparatus 24 at a rate of 1 pulse per 256 pulses of the clock signal 4A, in the counter 30, the timing immediately before reading of the reception side device 22A is set at the 248th to 256th pulse of the clock signal, and the number of pulses of the clock signal 4A in the reception side device 22A is counted. In the counter 30, when the number of pulses of the clock signal 4A reaches a preset value, the counter 30 sends this notice signal to the timing controller 35 and detector 31, and presence or absence of stored data in the register of the data storage 16A is investigated in the data management unit 32 provided in the timing controller 35, and if stored data is not present, the detector 31 detects that the reading of the reception side device 22A is earlier than the writing of the transmission side device 21A.

Likewise, by counting the number of pulses of the clock signal 1A from the transmission side device 21A in the counter 30, when the counter 30 detects that the transmission side device 21A reaches the timing immediately before writing, the counter 30 sends its notice signal to the timing controller 35 and detector 31, and presence or absence of stored data in the register of the data storage 16A is investigated in the data management unit 32 provided in the timing controller 35, and if stored data is present, the detector 31 detects that the reading timing of the reception side device 22A is delayed from the writing timing of the transmission side device 21A.

In this way, the digital audio data phase shifting apparatus 24 detects in the detector 31 that the reading timing of the reception side device 22A is earlier than or later than the writing timing of the transmission side device 21A, and the operation of the digital audio data phase shifting apparatus 24 in each case is described below.

First, when the reading timing of the reception side device 22A is earlier than the writing timing of the transmission side device 21A, audio data is not present in the data storage 16A at the timing immediately before reading of the reception side device 22A, and therefore the timing controller 35 issues a signal to output dummy data to the data storage 16A as provisional data until next audio data is fed, and, receiving this data, the data storage 16A outputs the dummy data preset in the dummy output unit 34 into the parallel-serial converter 17A through the data storage 16A. This dummy data is specific data showing the same sound is continuous, and in the case of PCM system generally employed as the code modulation system, for example, the previous output is used, or in the case of the ADPCM system, it is 0001. Thus, even in compressed audio signal, a function is provided to prevent deterioration of sound quality.

On the other hand, when the reading timing of the reception device 22A is later than the writing timing of the transmission side device 21A, the audio data in a bit row of 256 bits which is a piece of data written in the phase of one synchro signal 2A before stored in the data storage 16A, and the audio data in a bit row of 256 bits to be written in the phase of the present synchro signal 2A are compared in the data comparator 33, and the changing quantities of the two pieces of audio data are compared in the data comparator 33, and the result showing which one is greater in the change quantity is put into the detector 31, and the detector 31 deletes either audio signal so that the deterioration of sound quality may be smaller.

Incidentally, in the data comparator 33, it is judged which one is greater in the change quantity when reproduced as sound, and the one of the smaller change quantity is deleted as the audio data showing that a relatively same sound is continuous. Or, instead of comparing the previous audio data stored in the data storage 16A and the audio data to be stored presently, the present audio data may be eventually overwritten on the previous audio data.

Thus, in this embodiment, when adjusting the phase deviation by placing the digital audio data phase shifting apparatus 24 in the transmission route of audio data between the transmission side device 21A and reception side device 22A, if the writing timing of the transmission side device 21 is earlier than the reading timing of the reception side device 22A, the previously stored audio data is present in the data storage 16A, and the present audio data cannot be stored, either audio data is deleted, or if the writing timing of the transmission device 21A is later than the reading timing of the reception side device 22A, to the contrary, and audio data is not present in the data storage 16A, dummy data is outputted, so that the audio data can be transmitted without deteriorating the sound quality.

(Embodiment 3)

A third embodiment of the invention is described below by reference to a diagram.

Figure 3:
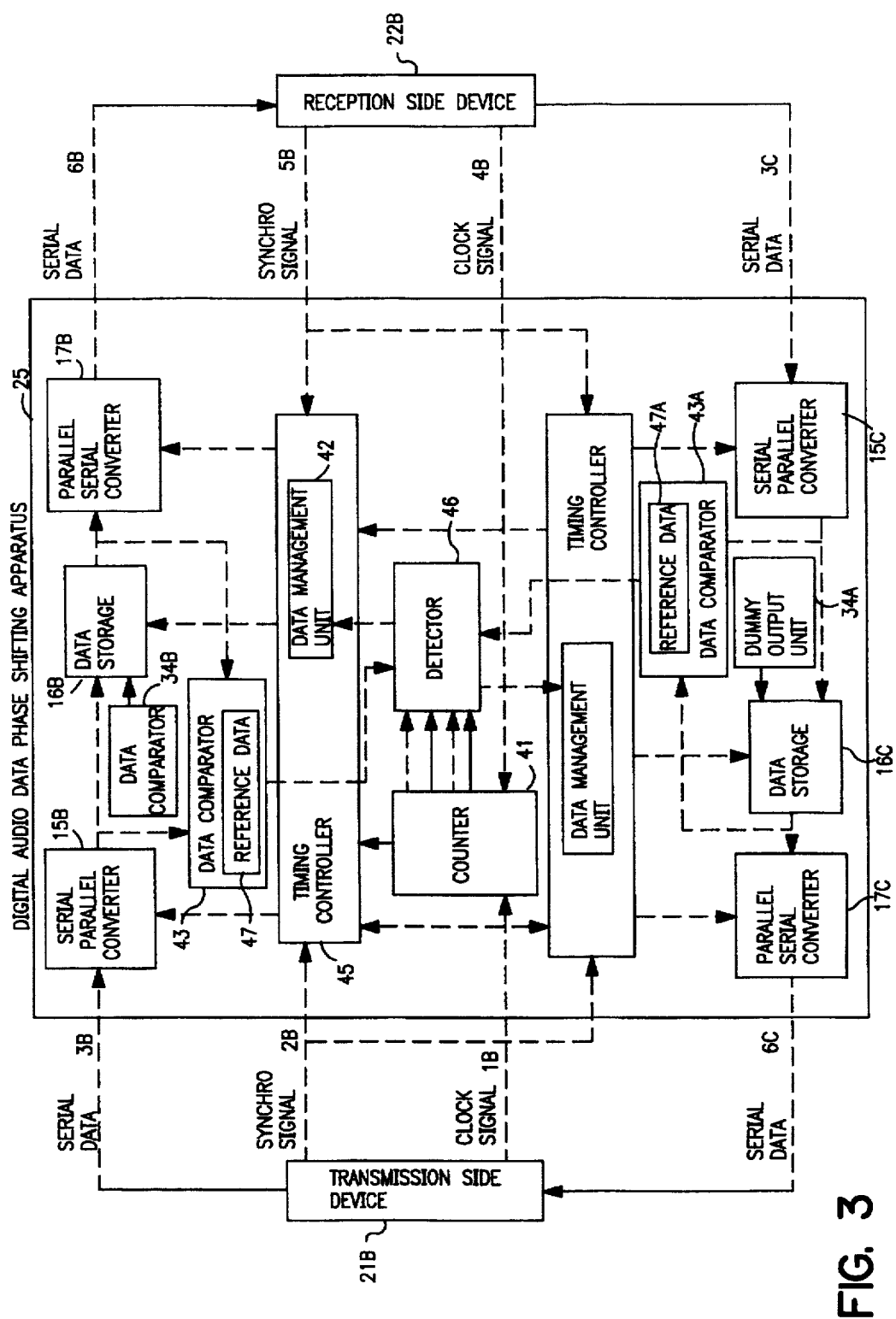
FIG. 3 is a block diagram shoving a constitution of a digital audio data phase shifting apparatus in a third embodiment of the invention.

FIG. 3 is a block diagram showing a constitution of a digital audio data phase shifting apparatus in the third embodiment of the invention, in which mutual communications are realized. In FIG. 3, the digital audio data phase shifting apparatus 25 comprises, same as in embodiment 2, a serial-parallel converter 15B for converting serial data 9B entered from a transmission side device 21B into parallel data, a parallel-serial converter 17B for converting parallel data into serial data, a data storage 16B for exchanging data between the serial-parallel converter 15B and parallel-serial converter 17B, and a dummy output unit 34 for outputting dummy data into the data storage 16A. In addition, the digital audio data phase shifting apparatus 25 further comprises a counter 41 for counting the number of pulses of the clock signal 1B from the transmission side device 21B and clock signal 4B from the reception side device 22B, and it is intended to detect the timing immediately before writing of the transmission side device 21B or the timing immediately before reading of the reception side device 22B, and moreover, different from the second embodiment, detect the timing at a specific moment before the timing immediately before reading of the transmission side device 21B. In a data comparator 43, furthermore, for comparing the input and output data of the data storage 16B, reference data 47 to compare when deleting the audio data is incorporated. Besides, reference numeral 46 is a detector in this embodiment, 42 is a data management unit in the embodiment, and 45 is a timing controller in the embodiment.

Meanwhile, FIG. 3 is a block diagram composed so as to realize mutual communications between the transmission side device 21B and reception side device 22B, in which a serial-parallel converter 15C, a data storage 16C, a parallel-serial converter 17C, a dummy output unit 34A, a data comparator 43A, and reference data 47A are constituted respectively same as the serial-parallel converter 15B, data storage 16B, parallel-serial converter 17B, dummy output unit 34B, data comparator 43, and reference data 47A as described above, and hence operate similarly. The operation of data transmission from the reception side device 22B to the transmission side device 21B in this constitution is done same as in the transmission from the transmission side device 21B and reception side device 22B, and in this embodiment, therefore, only the transmission from the transmission side device 21B to the reception side device 22B is described, and the operation of data transmission from the reception side device 22B to the transmission side device 21B is omitted.

What this embodiment differs from the second embodiment lies in the constitution in which not only the timing immediately before writing and reading of the transmission side device 21B and reception side device 22B is detected, but also the timing at a certain moment far before is detected, and the small audio data not apparently relating to the communications is deleted aggressively.

In thus constituted digital audio data phase shifting apparatus, its operation is described below.

The counter 41 counts the number of pulses of clock signal 1B of the transmission side device 21B, and detects the timing at a certain moment before the timing immediately before writing of the transmission side device 21B, and the timing controller 45 detects whether the audio data stored in the data storage 16B is present or not by the data management unit 42. In consequence, then audio data is present in the data storage 16B, the detector 46 detects that the writing timing of the transmission side device 21B is earlier than the reading timing of the reception side device 22B.

In such method of detection, at a certain moment more than immediately before writing of the transmission side device 21B, if the writing timing of the transmission side device 21B is earlier than the reading timing of the reception side device 22B, the audio data to be written and reference data 47 incorporated in the data comparator 43 are compared, and data showing small sound not affecting the speech is deleted.

As a result of comparison with the reference data 47 in the data comparator 43, if not deleted, at the timing immediately before writing as shown in the second embodiment, by comparing with the audio data stored in the data storage 16B, either is deleted.

As the reference data 47, if the audio data to be compared is not compressed by coding such as PCM system, data showing quiet state is stored in the data storage 16B, and if the audio data to be compared is compressed by coding such as ADPCM system, data showing continuity of nearly same sound is stored in the data storage 16B.

In the case of detection of timing immediately before writing of the transmission side device 21B, or timing immediately before reading of the reception side device 22B, the operation of the digital audio data phase shifting apparatus 25 is same as the operation shown in the second embodiment.

According to the function of this embodiment, therefore, when the writing timing of the transmission side device 21B is earlier than the reading timing of the reception side device 22B, when deviation is small, data showing small sound not relating to speech is deleted aggressively, and when small sound could not detected and the deviation increased, if data showing small sound is not fed, comparing with the stored data, either is deleted, so that the sound quality may not deteriorate.

(Embodiment 4)

A fourth embodiment of the invention is described below by reference to a diagram.

Figure 4:
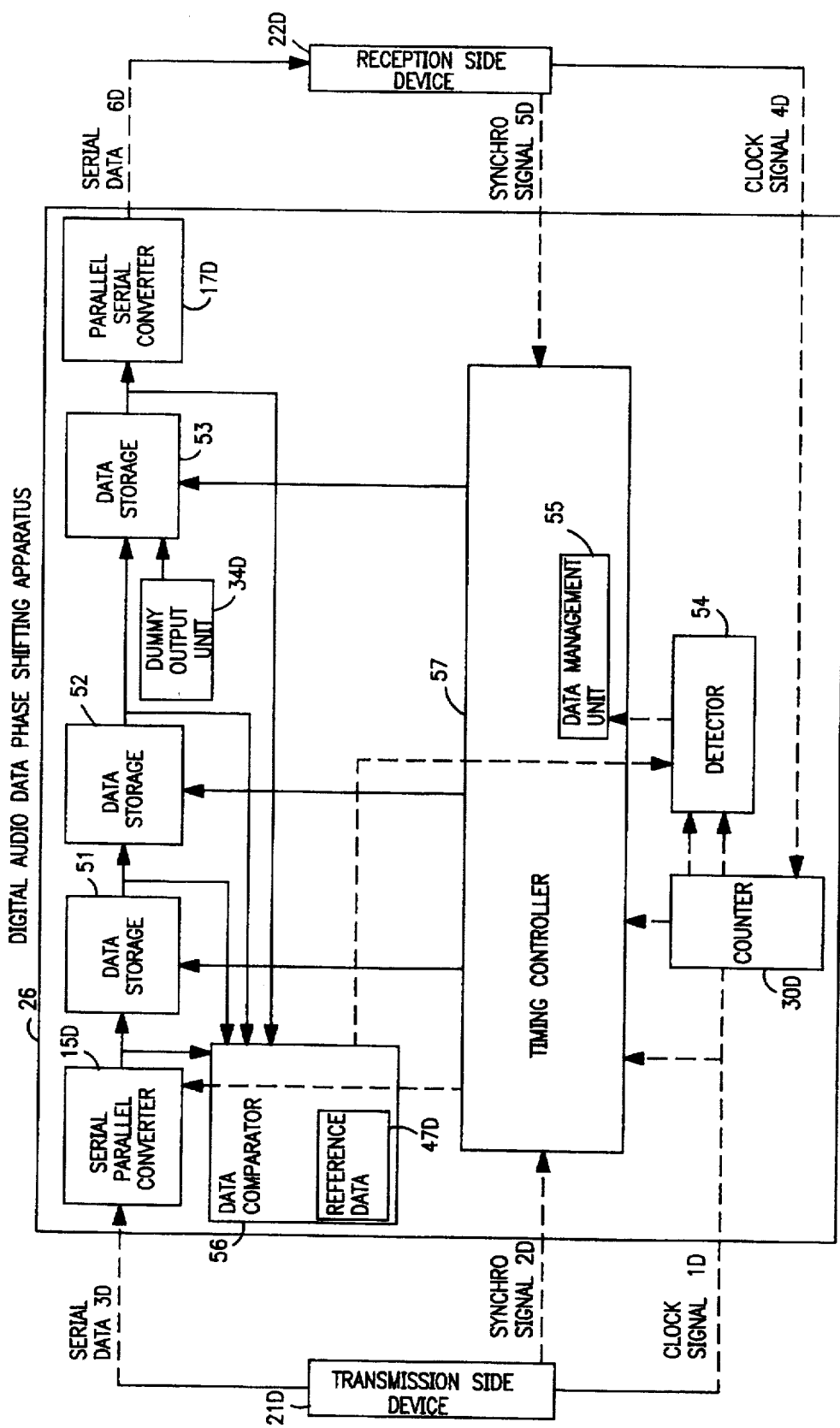
FIG. 4 is a block diagram showing a constitution of a digital audio data phase shifting apparatus in a fourth embodiment of the invention.

FIG. 4 is a block diagram shoving a constitution of a digital audio data phase shifting apparatus in the fourth embodiment of the invention, in which the digital audio data phase shifting apparatus 26 comprises, same as in the prior art, a serial-parallel converter 15D for converting input serial data into parallel data, a parallel-serial converter 17D for converting parallel data into serial data, a data storage 16D for exchanging data between the serial-parallel converter 15D and parallel-serial converter 17D, a counter 30D for counting the number of pulses of clock signal 1D of a transmission side device 21D and clock signal 4D of a reception side device 22D, and a dummy output unit 34D for outputting dummy data into a data storage 53.

Added or modified structures in the embodiment are described below.

Reference numeral 51, 52, 53 are data storages connected in series for storing plural pieces of data, 54 is a detector in this embodiment, 55 is a data management unit in the embodiment, 56 is a data comparator in the embodiment, and 57 is a timing controller in the embodiment.

In thus constituted digital audio data phase shifting apparatus, its operation is described below.

As shown in FIG. 4, the plural data storages 51, 52, 53 are connected in series, and when all storages are empty, the audio data written into the data storage 51 from the transmission side device 21D is sequentially read out and written in, and the audio data is exchanged between the storages, and sent up to the data storage 53. That is, if audio data is not present, and if audio data is not present in the data storage in a rear stage (reception side device 22D side), such empty data storage is designed to read in the data in a front stage (transmission side device 21D side). Accordingly, if empty data occurs due to phase deviation between the transmission side and reception side, the audio data is stored, as being packed to the rear stage side, in the storages 51, 52, 53.

If the writing timing of the transmission side device 21D is earlier than the reading timing of the reception side device 22D, and there is no stored data in the data storages 51, 52, 53, the output of the dummy data is made into the rearmost stage side data storage 53.

Thus, in this embodiment, having the buffer function against deviation of timing between the transmission side device 21D and reception side device 22D by exchanging the audio data written in from the transmission side device 21D by the plural data storages 51, 52, 53, it is possible to suppress the frequency of output of dummy data and deletion of audio data for preventing deterioration of sound quality, as shown in the second and third embodiments, when the deviation of clock signals 1D, 4D is large between the transmission side device 21D and reception side device 22D.

What is claimed is:

1. A digital audio data phase shifting apparatus comprising:

serial-parallel converting means for receiving audio data entered from a transmission side as serial data and converting into parallel data, data storing means for writing in and storing temporarily the audio data as parallel data from the serial-parallel converting means, parallel-serial converting means for i) reading out the audio data as parallel data from the data storing means, ii) converting again into serial data and iii) sending out to a reception side, and timing control means for i) receiving a first clock signal and a first synchro signal from the transmission side and a second clock signal and second synchro signal from the reception side, ii) controlling a writing timing of the audio data to the data storing means based on at least one of the first clock signal and the first synchro signal, and iii) controlling a reading timing of the audio data from the data storing means based on at least one of the second clock signal and the second synchro signal.

2. A digital audio data phase shifting apparatus of claim 1, further comprising:

counter means for counting a number of pulses of the second clock signal output from the reception side, and detecting a further timing immediately before the reading timing on the basis of the second synchro signal at the reception side, and a dummy output unit for storing the audio data read out from a rated storage means directly in the data storing means on the basis of the second synchro signal, wherein the timing control means judges if the audio data is present in the data storing means at the further timing immediately before reading at the reception side detected by the counter means, and, if audio data is absent, the same audio data output from the data storing means a previous time is output from the dummy output unit.

3. A digital audio data phase shifting apparatus of claim 1, further comprising:

counter means for counting a number of pulses of the second clock output from the reception side, and detecting a further timing immediately before the reading timing on the basis of the second synchro signal at the reception side, and dummy output means for outputting dummy data to the data storing means, wherein the timing control means, when it is known from the counter means that the reception side is at the further timing immediately before reading, judges if the audio data is present in the data storing means, and, if the audio data is absent, dummy data is output from the dummy output means to the data storing means.

4. A digital audio data phase shifting apparatus of claim 3, wherein the dummy data output from the dummy output means is data indicating a continuous sound.

5. A digital audio data phase shifting apparatus of claim 1, further comprising:

counter means for counting the number of pulses of the first clock signal output from the transmission side, and detecting a further timing immediately before the writing timing on the basis of the first synchro signal at the transmission side, wherein the timing control means judges if the audio data is present in the data storing means at the further timing immediately before writing of the transmission side detected by the counter means, and, if the audio data is present, the audio data presently written according to the first synchro signal in the data storing means is overwritten on the audio data previously written according to the first synchro signal.

6. A digital audio data phase shifting apparatus of claim 1, further comprising:

counter means for counting a number of pulses of the first clock signal output from the transmission side, and detecting a further timing immediately before the writing timing on the basis of the first synchro signal at the transmission side, data comparing means for comparing the audio data already stored in the data storing means, and further audio data to be stored presently, and detecting means for deleting unwanted audio data as a result of the comparison in the data comparing means, wherein the timing control means, when it is known from the counter means that the transmission side is at the timing immediately before writing, judges if the audio data is present in the data storing means, and, if the audio data is present, it is compared with the further audio data received presently in the data comparing means, and the unwanted data is deleted by the detecting means.

7. A digital audio data phase shifting apparatus of claim 6, wherein the data comparing means compares a change quantity of the audio data when the audio data already stored in the data storing means and the further audio data to be stored presently are transformed into sound, and one of the audio data already stored and the further audio data to be stored having a smaller change quantity is deleted.

8. A digital audio data phase shifting apparatus of claim 1, further comprising:

counter means for counting a number of pulses of the first clock signal output from the transmission side, and detecting a specific timing immediately before the writing timing on the basis of the first synchro signal at the transmission side, data comparing means having reference data for comparing with the audio data at the timing detected by the counter means, and detecting means for deleting audio data judged unnecessary by the data comparing means, wherein the timing control means, when it is known from the counter means that the transmission side is at the specific timing before the writing timing, judges if the audio data is present in the data storing means, and, if the audio data is present, the audio data received at the timing detected by the counter means is compared with the reference data in the data comparing means, and if the audio data is not necessary, it is deleted by the detecting means.

9. A digital audio data phase shifting apparatus of claim 8, wherein the reference data used in the data comparing means is one of i) data showing a quiet state when the audio data is coded by a Pulse Coded Modulation (PCM) method, and ii) data showing a substantially identical continuous sound when coded by an Adaptive Differential PCM (ADPCM) method.

10. A digital audio data phase shifting apparatus of claim 8, wherein the received audio data and the reference data are compared in the data comparing means in terms of a change quantity, and one of i) the audio data already stored and ii) the audio data to be stored having a smaller change quantity is deleted.

11. A digital audio data phase shifting apparatus of claim 1, wherein the data storing means is arrayed by connecting a plurality of storing means in series.

12. A digital audio data phase shifting apparatus of claim 11, wherein the audio data written in from the storing means of a front stage of the plurality of storing means connected in series is stored in the storing means arranged in a front stage direction sequentially from the storing means of a rearmost stage of the plurality of storing means.

13. A digital audio data phase shifting apparatus of claim 1, wherein said writing timing and said reading timing are different from one another.

* * * * *